(12) United States Patent
Bonnefous et al.

(10) Patent No.: US 6,279,602 B1
(45) Date of Patent: Aug. 28, 2001

(54) VALVE WITH IMPROVED PISTON WITH ELASTOMER O-RING

(75) Inventors: Jean Bonnefous, Reze; Bruns Maraud, Goulaine, both of (FR)

(73) Assignee: Defontaine (FR)

( * ) Notice: Subject to any disclaimer, the term of this patent is extended or adjusted under 35 U.S.C. 154(b) by 0 days.

(21) Appl. No.: 09/535,570

(22) Filed: Mar. 27, 2000

(30) Foreign Application Priority Data

Apr. 2, 1999 (FR) .................................................... 9904186

(51) Int. Cl.[7] ............................ F16K 11/20; F16K 31/122
(52) U.S. Cl. ............... 137/315.27; 137/312; 137/614.18; 137/614.19; 257/324; 257/900
(58) Field of Search .................................. 137/240, 312, 137/614.17, 614.18, 614.19, 315.27; 251/63, 63.5, 324, 357, 900

(56) References Cited

U.S. PATENT DOCUMENTS

| 2,130,614 | | 9/1938 | Collins et al. | |
|---|---|---|---|---|
| 2,401,377 | * | 6/1946 | Smith | 251/357 |
| 2,661,182 | | 12/1953 | Kipp . | |
| 2,690,360 | * | 9/1954 | Young | 251/900 |
| 2,933,285 | * | 4/1960 | Tucker | 251/324 |
| 3,517,688 | * | 6/1970 | Scholle | 251/357 |
| 3,828,815 | | 8/1974 | Botnick | 137/625.26 |
| 4,037,753 | * | 7/1977 | Brandau | 251/63.5 |
| 4,154,426 | * | 5/1979 | Santy et al. | 251/175 |
| 4,373,545 | | 2/1983 | Knappe | 137/240 |
| 4,995,416 | * | 2/1991 | Takeuchi et al. | 137/312 |
| 5,699,825 | * | 12/1997 | Norton | 137/238 |
| 6,009,896 | * | 1/2000 | Van Oosten | 137/240 |

FOREIGN PATENT DOCUMENTS 2818787   11/1979  (DE) .
247589    6/1926   (GB) .

* cited by examiner

Primary Examiner—George L. Walton
(74) Attorney, Agent, or Firm—Bachman & LaPointe, P.C.

(57) ABSTRACT

A piston type valve includes a piston moving in a cylindrical seat. The piston is fastened to an operating rod extending along the axis of the cylindrical seat. The perimeter of the piston carries an elastomer O-ring providing the seal between the piston and the cylindrical seat. The piston includes two piston members fixed axially together by clamping means. Each of the two members includes an annular groove of substantially circular arc shaped cross section open toward the groove on the other member. The elastomer O-ring is housed between the two annular grooves and clamped between them by the clamping means.

8 Claims, 5 Drawing Sheets

VALVE WITH IMPROVED PISTON WITH ELASTOMER O-RING

BACKGROUND OF THE INVENTION

1. Field of the Invention

The present invention relates to a valve with an improved piston with an elastomer O-ring intended in particular for the agrifoods and sanitation industries.

2. Description of the Prior Art

Valves for use in the above industries must be designed to avoid all risk of pollution of the liquid passing through the valves by bacteria that can grow within the valves.

Some prior art valves include a piston moving inside a cylindrical seat, the piston being fastened to an operating rod running along the axis of the cylindrical seat and the perimeter of the piston carrying an elastomer O-ring providing the seal between the piston and the cylindrical seat.

In the above type of valve, the elastomer O-ring is a force fit in a trapezoidal cross section groove in the piston. This arrangement has many disadvantages.

The most important of these disadvantages is that the product passing through the valve may become trapped between the groove and the O-ring, which can encourage the growth of bacteria.

Bacteria can also grow to the rear of the O-ring if it is defective (mechanically, chemically, thermally or otherwise).

The object of the present invention is to provide a piston type valve which does not have the above disadvantages and which has advantages of its own.

SUMMARY OF THE INVENTION

The invention therefore provides a piston type valve including a piston moving in a cylindrical seat, wherein the piston is fastened to an operating rod extending along the axis of the cylindrical seat, the perimeter of the piston carries an elastomer O-ring providing the seal between the piston and the cylindrical seat, the piston includes two piston members fixed axially together by clamping means, each of the two members includes an annular groove of substantially circular arc shaped cross section open toward the groove on the other member, and the elastomer O-ring is housed between the two annular grooves and clamped between them by the clamping means.

The O-ring, positioned between the two annular grooves, is deformed when the two piston members move toward each other and is therefore crushed into a shape complementary to the shape of the grooves.

Accordingly, when the two piston members are clamped together, the O-ring completely fills the two facing grooves. The O-ring can also deform radially inward and radially outward relative to the grooves.

This eliminates the risk of the product penetrating between the O-ring and the piston.

All risk of the growth of bacteria is therefore avoided, through leaving no empty space between the respective surfaces of the O-ring and the annular grooves, so making a perfect seal between the O-ring and said grooves; the seal between the piston and the seat is also improved.

In an advantageous version of the invention, a space remains between the two facing surfaces of said two piston members into which said O-ring can deform after fitting said O-ring and clamping said two piston members together.

The two piston members are preferably fixed axially together by a threaded rod carried by one of the members and screwed into a screwthread in the other member.

The two piston members are preferably clamped together sufficiently for the O-ring to become deformed and to project toward the empty space and toward the outside of the periphery of the two piston members so as to be pressed in a sealed manner against the cylindrical seat.

In an advantageous version of the invention, each edge connecting each annular groove and the adjacent surface of the corresponding piston member has a substantially rounded shape.

Accordingly, when the two piston members are clamped together, the O-ring is deformed and therefore crushed to provide a perfect seal not only at each of the grooves but also at the edges connecting each annular groove to the adjacent surface of the corresponding piston member.

The pressure of the O-ring against the cylindrical seat can therefore be adjusted to obtain the optimum conditions of sealing, of rubbing of the O-ring on the seat, of ease of operation and of reduced wear of the O-ring.

In a preferred version of the invention, the piston member opposite that carrying the operating rod carries a hollow rod whose interior communicates with the empty space between the two facing surfaces of the two piston members via at least one opening.

Thus in the case of a defective O-ring or a leak, the product passing through the valve can enter the space between the two piston members and from there the interior of the hollow rod so that it can be evacuated to the exterior.

There is therefore no risk of bacteria growing to the rear of the O-ring in the event of a leak.

Other features and advantages of the invention will become apparent in the course of the following description.

BRIEF DESCRIPTION OF THE DRAWINGS

In the accompanying drawings, which are given by way of non-limiting example.

DETAILED DESCRIPTION OF THE PREFERRED EMBODIMENTS

Figure 1:
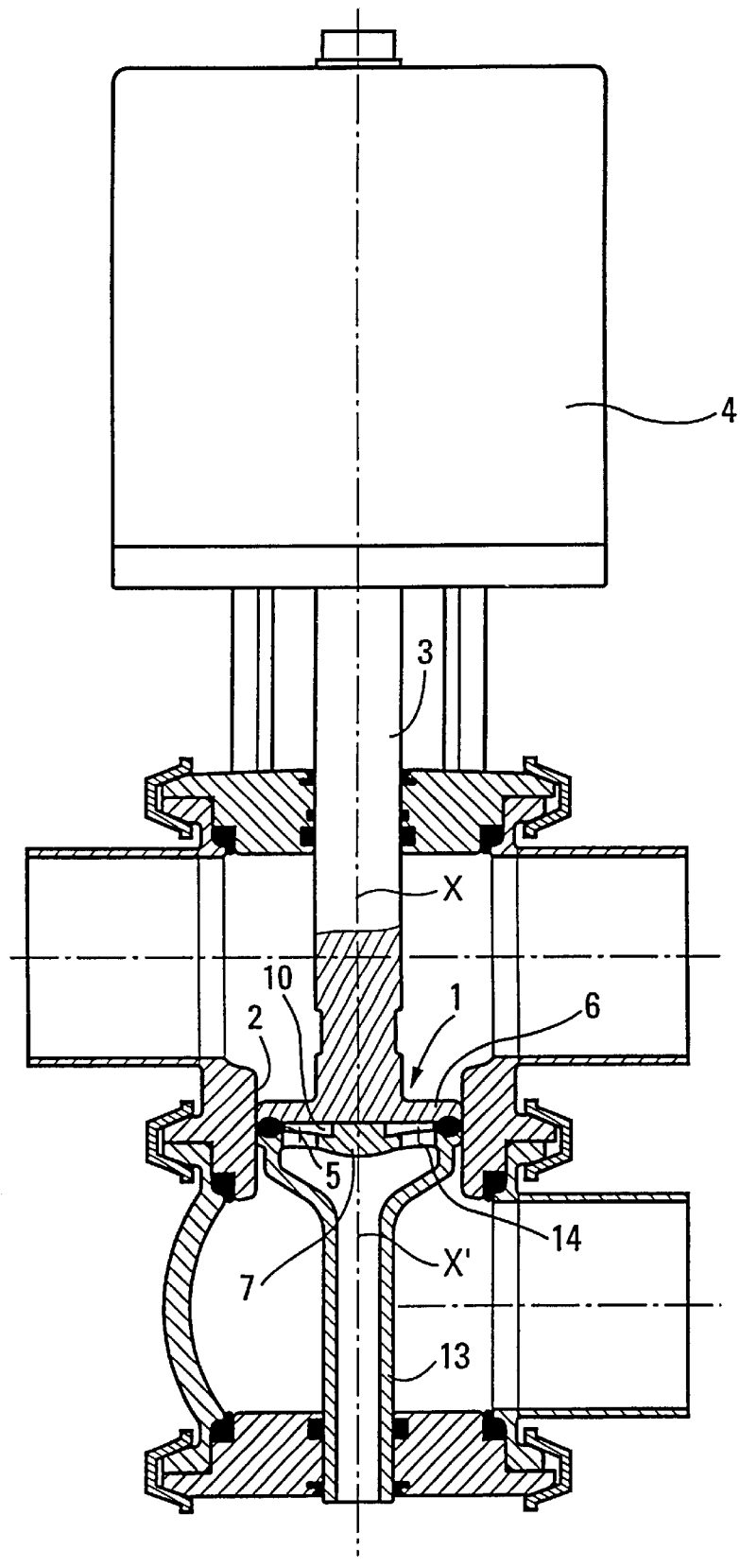
FIG. 1 is a view in axial section of a piston type valve according to the invention.

In the embodiment shown in FIG. 1, the piston type valve includes a piston 1 mobile in a cylindrical bore 2.

The piston 1 is fastened to an operating rod 3 extending along the axis X–X' of the cylindrical seat 2.

The operating rod 3 is actuated by an actuator 4.

The perimeter of the piston 1 carries an elastomer O-ring 5 providing the seal between the piston 1 and the cylindrical seat 2.

According to the invention, the piston 1 comprises two piston members 6, 7 fixed together by axial clamping means.

Figure 2:
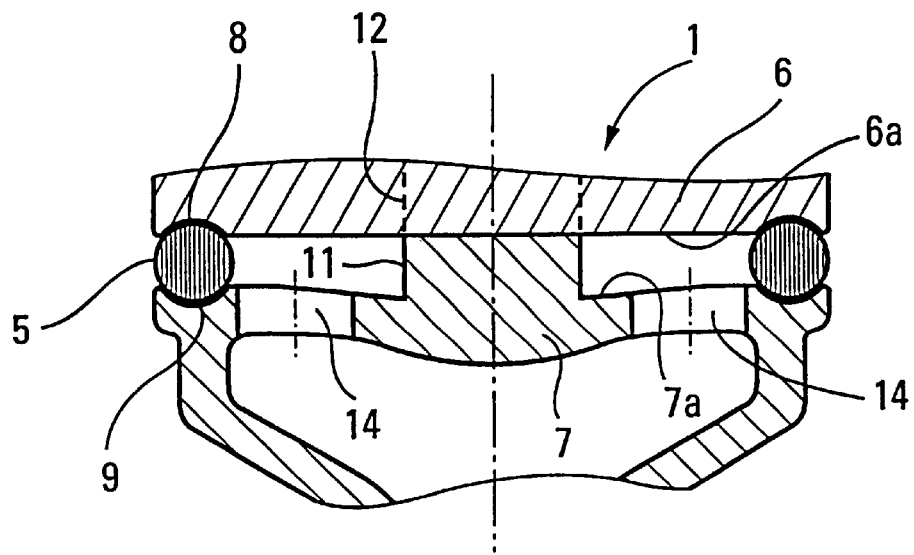
FIG. 2 is a sectional view to a larger scale of the piston before the O-ring is clamped.
Figure 3:
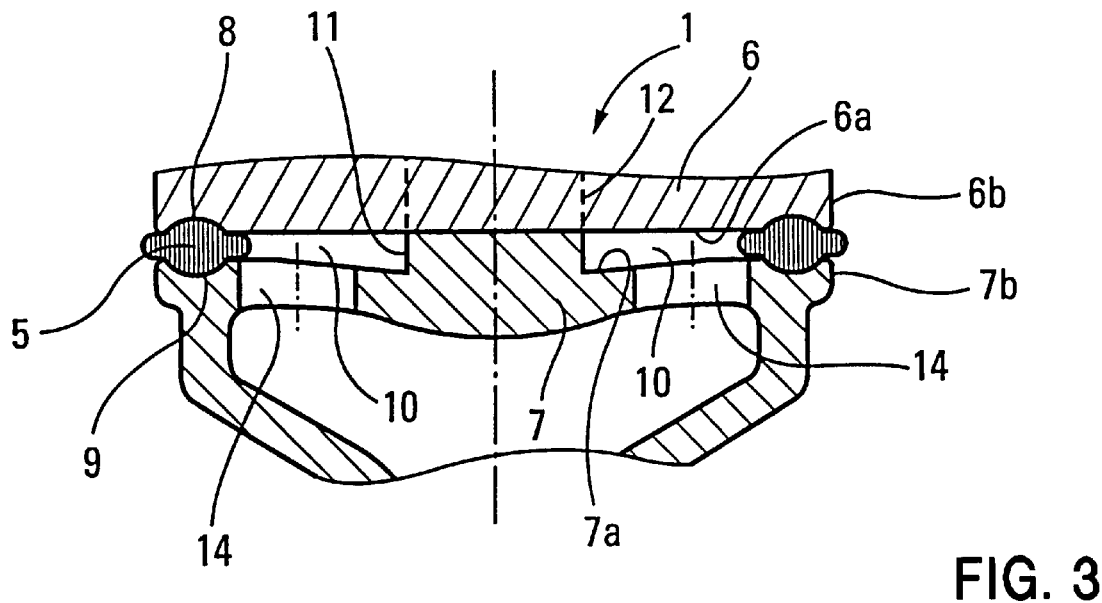
FIG. 3 is a view analogous to that of FIG. 2 after the O-ring is clamped.

As shown in FIGS. 2 and 3, each of the two members 6, 7 includes an annular circular arc section groove 8, 9 open toward the groove 8, 9 on the other member.

The elastomer O-ring 5 is housed between the two annular grooves 8, 9 and clamped between them by the clamping means.

The diameter of the O-ring 5 is chosen according to the dimensions of the two annular grooves 8, 9 so that, after the two piston members 6, 7 are clamped together, the O-ring 5 completely fills the volume between the two annular grooves 8, 9.

As shown in FIG. 3, after fitting the O-ring 5 and clamping the two piston members 6, 7 there is a space 10 between the two facing surfaces 6a, 7a of the two piston members 6, 7 and the O-ring 5 can deform toward this space.

In the example shown, the two piston members 6, 7 are fixed axially together by a threaded rod 11 carried by the member 7 and screwed into a screwthread 12 in the other member 6.

In the position shown in FIG. 3, the two piston members 6, 7 have been clamped sufficiently for the O-ring 5 to be deformed so that it projects toward the empty space 10 and toward the outside of the periphery 6b, 7b of the two piston members 6, 7 and therefore pressed in a sealed manner against the cylindrical seat 2.

FIG. 1 also shows that the piston member 7 opposite that carrying the operating rod 3 carries a hollow rod 13. The interior of the rod 13 communicates with the empty space 10 between the two facing surfaces 6a, 7a of the two piston members 6, 7 via openings 14.

Figure 4:
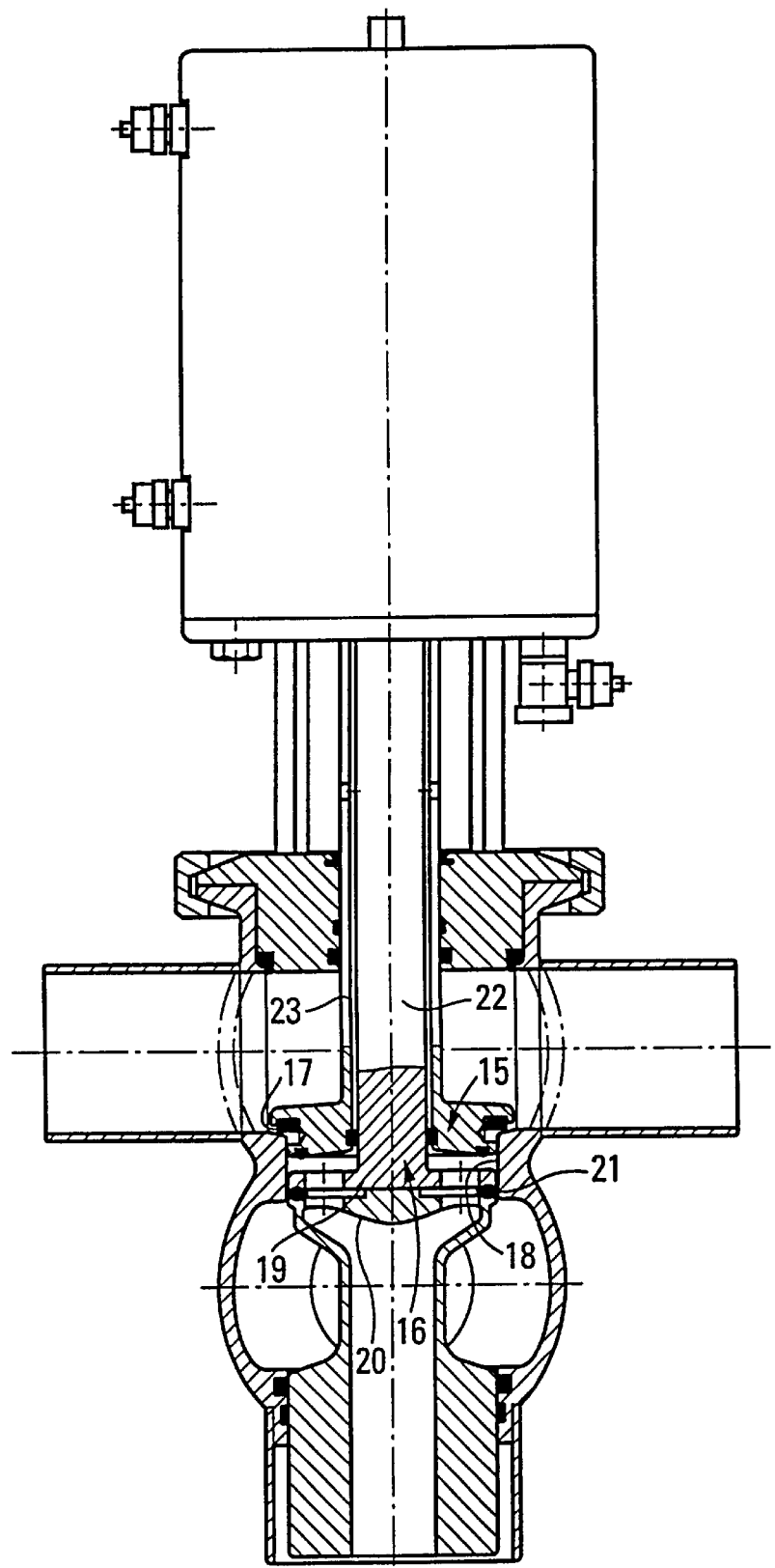
FIG. 4 is a view analogous to that of FIG. 1 showing a valve with two pistons, one of which is a piston according to the invention.

In the version shown in FIG. 4, the valve has two pistons 15, 16. The piston 15 is of conventional design. It includes a O-ring 17 which in the closed position of the valve bears on the edge of the cylindrical seat 18.

The other piston 16 comprises two members 19, 20 with an O-ring 21 clamped between them. The structure of the piston 16 conforms to that shown in FIGS. 1 to 3.

The operating rod 22 of the piston 16 with two members 19, 20 is mounted to slide in the operating rod 23 of the piston 15.

Figure 5:
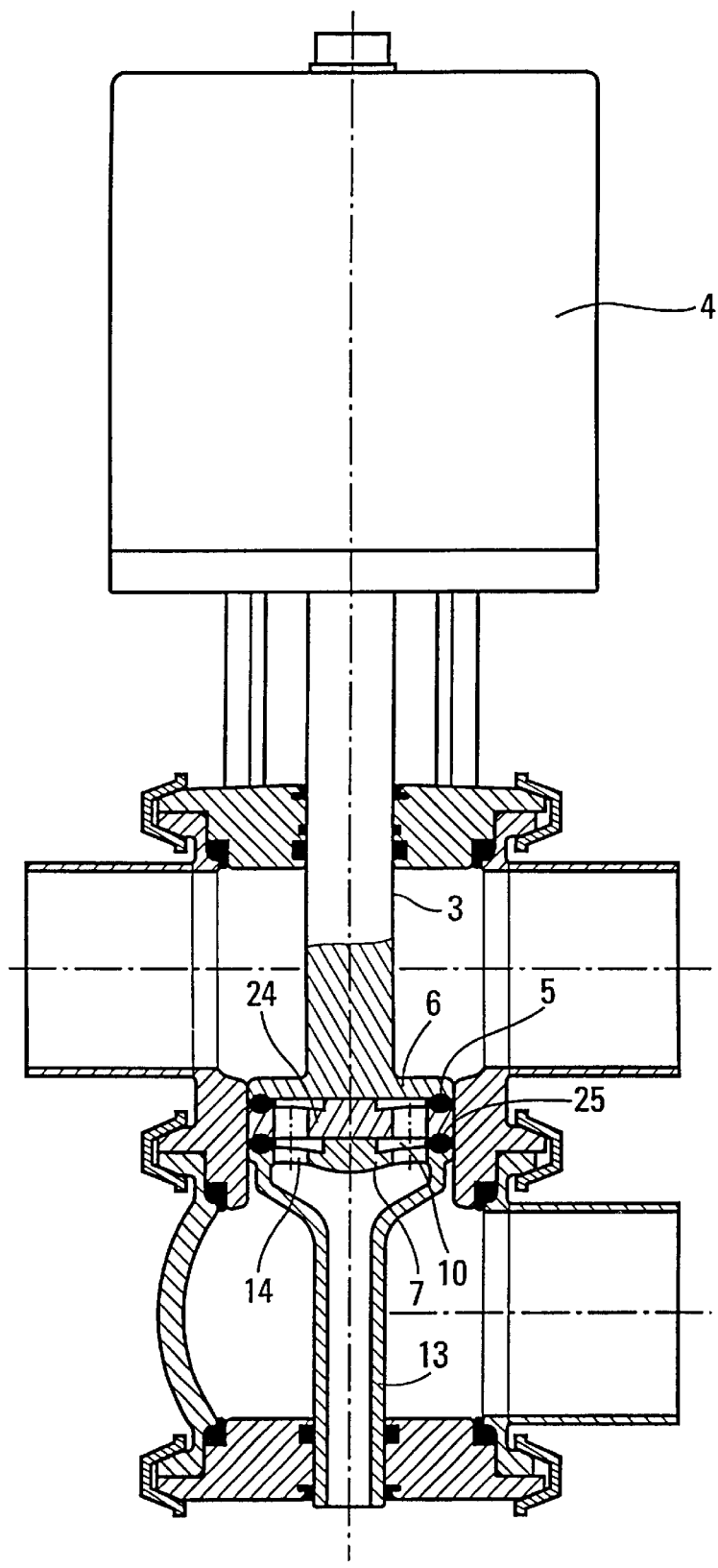
FIG. 5 is a view analogous to that of FIG. 4 showing a valve with two pistons according to the invention each comprising three piston members.

In the version shown in FIG. 5, the second piston member 24 is an intermediate member screwed axially to the first piston member 6. The intermediate member 24 is axially screwed to a third piston member 7 incorporating an annular groove which is open toward the groove on the intermediate member 24.

An elastomer O-ring 25 is housed between the above two grooves and clamped between them when the intermediate member 24 is screwed axially relative to the third member 7.

In this example, the third member 7 carries a hollow rod 13 whose interior communicates with the empty space 10 between the facing two surfaces of the intermediate member 24 and the third member 7.

Likewise, the intermediate member 24 has openings in it which communicate with the empty space between the intermediate member 24 and the first piston member 6.

Figure 6:
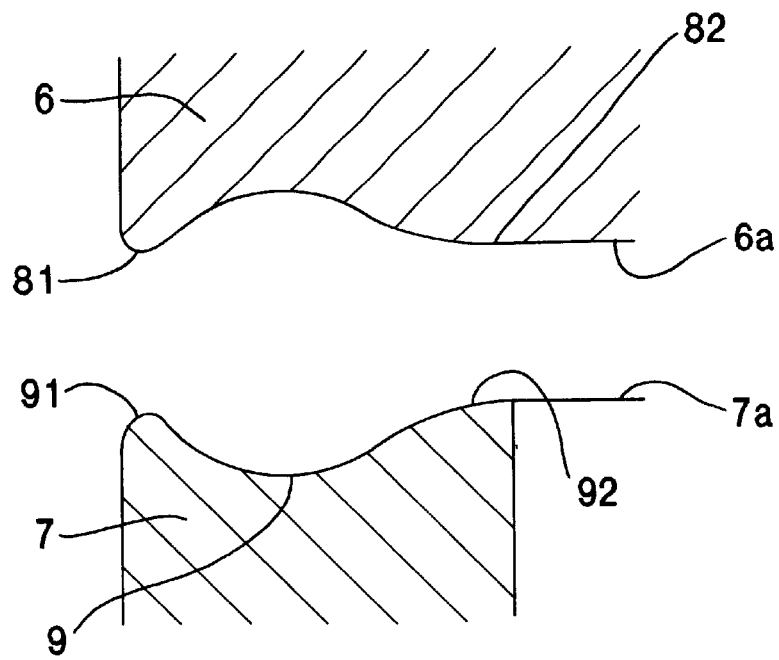
FIG. 6 is a partial view to a larger scale of part of FIG. 2 showing another embodiment of the invention, the O-ring being omitted to clarify the figure.
Figure 7:
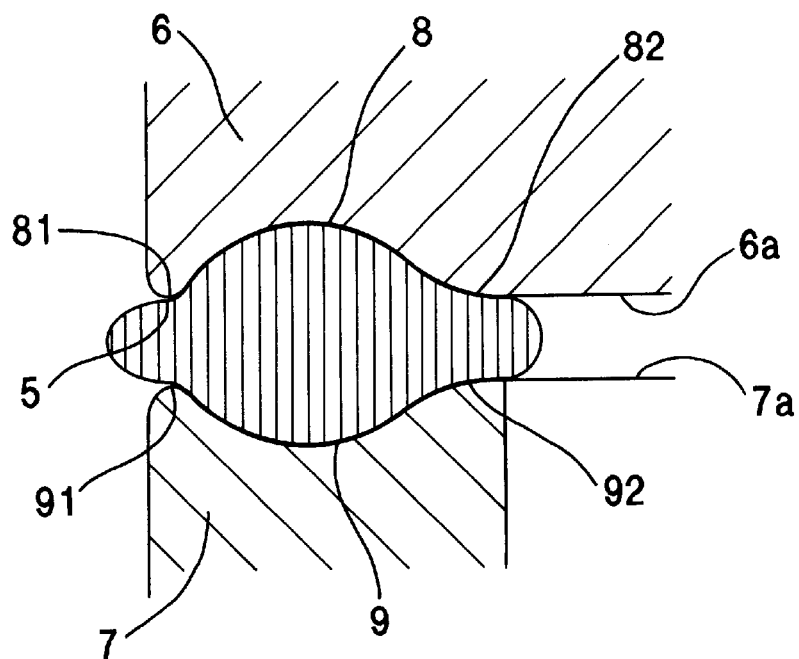
FIG. 7 is a view similar to that of FIG. 6 showing the O-ring clamped by the two piston members.

In the embodiment shown in FIGS. 6 and 7, each of the edges 81, 82, 91, 92 connecting each annular groove 8, 9 and the adjacent surface 6a, 7a of the corresponding piston member 6, 7 has a substantially rounded shape.

As shown in FIG. 7, in the crushed configuration of the O-ring 5 after clamping of the two piston members 6, 7, the O-ring 5 mates perfectly with the shapes of the annular grooves 8, 9 and the adjacent surfaces 6a, 7a over a radial distance significantly greater than the radial dimension of the annular grooves 8, 9, which guarantees an excellent seal.

The main advantage of the piston type valves 1 just described are as follows:

1. The first advantage is the fact that in use the product passing through the valve cannot become lodged between the piston and the O-ring since there is no empty space there and there is therefore no risk of bacterial infection. This advantage results from the fact that the O-ring is clamped between the grooves of the two piston members and completely fills those grooves.

2. The second advantage lies is that the central part of the half-grooves is not closed but discharges to the exterior of the valve by way of a special passage: accordingly, if an overpressure in the product passing through the valve were to pass through the sealing barrier formed by the O-ring and the two half-grooves, the product would be immediately evacuated to the exterior and consequently there could be no growth of bacteria to the rear of the O-ring. This is not the case with valves which at present do not feature this innovation.

3. The third advantage is that, once the two half-grooves have been clamped together, the O-ring is not "enclosed" in its groove and can, by virtue of its visco-elastic behavior, move slightly toward the interior of the piston when the valve is closed, so that rubbing between the O-ring and the valve body is reduced. The benefits are a reduced operating force and a longer service life of the O-ring.

4. The fourth advantage is a consequence of the third one. Valves in the agrifoods and sanitation industries routinely operate at temperatures in the range from 1° C. to 150° C. The materials used for the O-rings have coefficients of thermal expansion very much greater than those of the metals from which the valve bodies and pistons are made. Without the possibility of expansion toward the center of the piston offered by this innovation, operating the valve becomes difficult or even impossible at high temperatures: by expanding into a closed groove with a wedging effect, the O-ring jams the valve. What is more, when the valve has been operated several times at a high temperature, premature wear of the rubbing part of the O-ring causes the valve to leak at low temperatures because of lack of compression of the O-ring. The innovation described herein, by avoiding the wedging effect previously described, ensures regular and consistent operation throughout a range of temperatures from 1° C. to 150° C.

Of course, the invention is not limited to the example just described, to which many modifications can be made without departing from the scope of the invention.

What is claimed is:

1. A piston type valve including a first piston moving in a cylindrical seat, wherein said first piston is fastened to an operating rod extending along an axis of said cylindrical seat, said first piston having a perimeter which carries a first elastomer O-ring for providing a seal between said first piston and said cylindrical seat, said first piston including first and second piston members fixed axially together by clamping means, said first piston member having a first transverse surface and a first annular groove of substantially circular arc shaped cross section, said first annular groove being at a distance from said perimeter of said first piston and being connected to said first transverse surface by an inner edge and an outer edge each having a substantially rounded shape, said second piston member having a second transverse surface and a second annular groove of substantially circular arc shaped cross section, said second annular groove being at a distance from said perimeter of said first piston and being connected to said second transverse surface by an inner edge and an outer edge each having a substantially rounded shape, said first transverse surface facing said second transverse surface and said first annular groove being open toward and in alignment with said second annular groove, said first elastomer O-ring is housed between said first and second annular grooves and clamped between said first and second annular grooves by said clamping means, and an empty space between the first and second transverse surfaces into which empty space said elastomer O-ring can deform after fitting said O-ring and clamping said first and second piston members together.

2. The valve claimed in claim 1, wherein said first and second piston members are fixed axially together by a threaded rod carried by said second piston member and screwed into a screwthread in said first piston member.

3. The valve claimed in claim 1, wherein said first and second piston members are clamped together sufficiently for said elastomer O-ring to become deformed and to project toward said empty space and toward an outside of the periphery of said first and second piston members so as to be pressed in a sealed manner against said cylindrical seat.

4. The valve claimed in claim 1, wherein said first piston member carries said operating rod and said second piston member carries a hollow rod whose interior communicates with said empty space between said first and second transverse surface s via at least one opening.

5. The valve claimed in claim 1, further including a second piston.

6. The valve claimed in claim 5, wherein said second piston is of conventional design and has an operating rod and wherein said operating rod fastened to said first piston is mounted to slide in said operating rod of said second piston.

7. The valve claimed in claim 1, wherein said second piston member is an intermediate piston member having a third arcuate shaped annular groove disposed on a third transverse surface opposite said second transverse surface, said intermediate piston member being screwed axially to said first piston member and to a third piston member, said third piston member including a fourth annular groove on a fourth transverse surface facing said third transverse surface of said intermediate piston member, said fourth annular groove being open toward said third annular groove, said second and third annular grooves being in alignment with said first and fourth annular grooves, a second elastomer ring is housed between said third and fourth annular grooves and clamped between said third and fourth annular grooves on axial screwing of said intermediate piston member relative to said third piston member and a second space between said third transverse surface and said fourth transverse surface into which said second elastomer O-ring can deform after fitting said second O-ring and clamping said intermediate and third piston members together.

8. The valve claimed in claim 7, wherein said third piston member carries a hollow rod whose interior communicates with said empty space between said third and fourth transverse surfaces.

* * * * *